(12) United States Patent
Sugiura et al.

(10) Patent No.: US 9,627,947 B2
(45) Date of Patent: Apr. 18, 2017

(54) CONNECTOR TERMINALS PROJECTING FROM A PERIPHERAL WALL OF A CONNECTOR MOUNTED ON A CIRCUIT BOARD

(71) Applicant: DENSO CORPORATION, Kariya, Aichi-pref. (JP)

(72) Inventors: Hiroyasu Sugiura, Kariya (JP); Shuhei Miyachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/016,345

(22) Filed: Feb. 5, 2016

(65) Prior Publication Data

US 2016/0276764 A1    Sep. 22, 2016

(30) Foreign Application Priority Data

Mar. 16, 2015  (JP) .................................. 2015-52011

(51) Int. Cl.
| | |
|---|---|
| *H01R 3/00* | (2006.01) |
| *H02K 11/33* | (2016.01) |
| *H01R 13/641* | (2006.01) |
| *H02K 5/22* | (2006.01) |

(52) U.S. Cl.
CPC ........... *H02K 11/33* (2016.01); *H01R 13/641* (2013.01); *H02K 5/22* (2013.01)

(58) Field of Classification Search
CPC ........ H01R 9/091; H01R 12/00; H01R 12/58; H01R 23/725; H01R 43/0256; H01R 13/641
USPC ........... 439/83, 65, 75, 488, 489; 310/43, 64
See application file for complete search history.

(56) References Cited

U.S. PATENT DOCUMENTS

| | | | | |
|---|---|---|---|---|
| 3,289,148 A | * | 11/1966 | Antes | H01R 12/721 439/637 |
| 4,824,398 A | * | 4/1989 | Taylor | H01R 12/716 439/557 |
| 5,562,486 A | * | 10/1996 | Saijo | H01R 13/4362 439/188 |
| 6,452,754 B1 | * | 9/2002 | Mizuta | G11B 5/486 174/117 FF |
| 6,764,314 B1 | * | 7/2004 | Lee | H01R 12/57 439/65 |
| 2006/0089018 A1 | * | 4/2006 | Orita | H01R 12/57 439/74 |
| 2010/0267256 A1 | * | 10/2010 | Eriguchi | H01R 12/724 439/83 |
| 2011/0215658 A1 | * | 9/2011 | Tanabe | H01R 12/707 310/43 |
| 2011/0285223 A1 | | 11/2011 | Miyachi et al. | |
| 2011/0287640 A1 | * | 11/2011 | Yang | H01R 12/7052 439/83 |
| 2015/0156927 A1 | | 6/2015 | Tsuboi | |

* cited by examiner

*Primary Examiner* — Chandrika Prasad

(57) ABSTRACT

A circuit board is held by a holding member. A connector portion is located on an opposite side of the circuit board from the holding member. A connector terminal is projected from a portion of the peripheral wall portion, bent at a bent portion toward the circuit board, and connected with the circuit board. The connector terminal includes a projected portion, which is located closer to the peripheral wall portion than the bent portion, and an inserted portion, which is inserted in a through hole of the circuit board. The projected portion is shifted from the inserted portion when viewed from a side of the connector portion.

15 Claims, 7 Drawing Sheets

CONNECTOR TERMINALS PROJECTING FROM A PERIPHERAL WALL OF A CONNECTOR MOUNTED ON A CIRCUIT BOARD

CROSS REFERENCE TO RELATED APPLICATION

This application is based on reference Japanese Patent Application No. 2015-52011 filed on Mar. 16, 2015, the disclosure of which is incorporated herein by reference.

TECHNICAL FIELD

The present disclosure relates to an electronic device.

BACKGROUND

Conventionally, a known electronic device is employed to control operation of a motor. For example, Patent Document 1 discloses a controller including two circuit boards. A connector is equipped between the two circuit boards. A terminal, which connects the connector with the circuit boards, is inserted through a gap between two circuit boards to the circuit board.

(Patent Document 1)

Publication of unexamined Japanese patent application No. 2012-10576 In the configuration of Patent Document 1, the connector is equipped between the two circuit boards. In addition, the terminal of the connector and the circuit boards are connected with each other by, for example, soldering. In such a configuration, the soldering is implemented from outside of each of the circuit boards. In addition, a connection state can be confirmed from the side of the tip end of the terminal. It is noted that, a connector may not be equipped between two circuit boards. In an assumable configuration, a connector may be equipped to the side of one circuit board. In such an assumable configuration, a connection position between a connector terminal and one circuit board may be covered by the other circuit board or the like. Therefore, in the assumable configuration, visual confirmation of a connection state may be difficult from the side of a tip end of the terminal.

SUMMARY

It is an object of the present disclosure to produce an electronic device configured to enable confirmation of a connection state between a connector terminal and a circuit board from a side of the connector.

According to an aspect of the disclosure, an electronic device comprises a circuit board held by a holding member. The electronic device further comprises a connector portion located on an opposite side of the circuit board from the holding member. The connector portion has a peripheral wall portion, which has a portion inside an outer periphery of the circuit board. The electronic device further comprises at least one connector terminal projected from the portion of the peripheral wall portion. The at least one connector terminal is bent at a bent portion toward the circuit board and is connected with the circuit board. The at least one connector terminal includes a projected portion and an inserted portion. The projected portion is located closer to the peripheral wall portion than the bent portion. The inserted portion is inserted in a through hole of the circuit board. The projected portion is shifted from the inserted portion when viewed from a side of the connector portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, an electronic device according to the present disclosure will be described with reference to drawings.

First Embodiment

Figure 1:
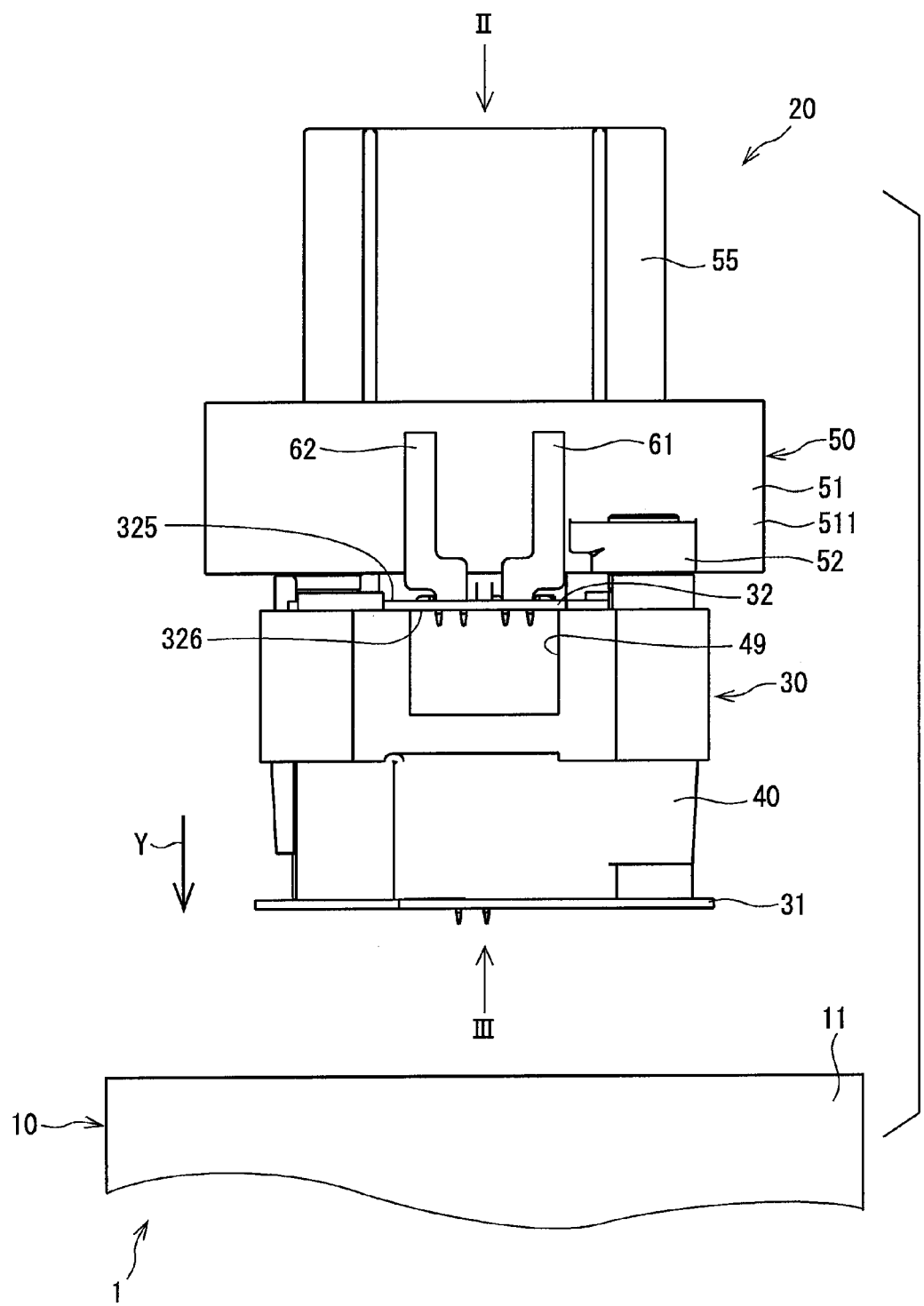
FIG. 1 is a side view showing an electronic device according to a first embodiment of the present disclosure.
Figure 2:
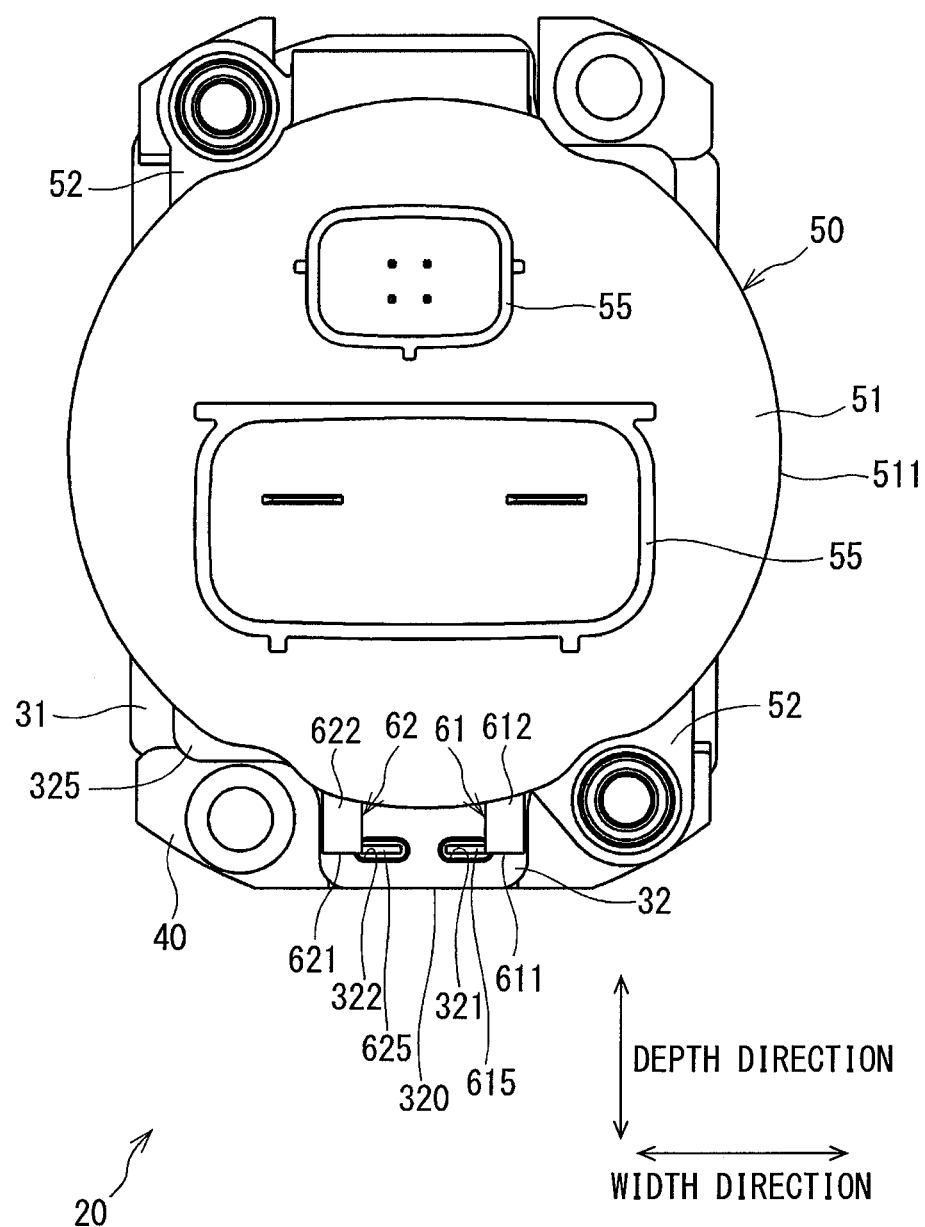
FIG. 2 is a view viewed along an arrow II in FIG. 1.
Figure 3:
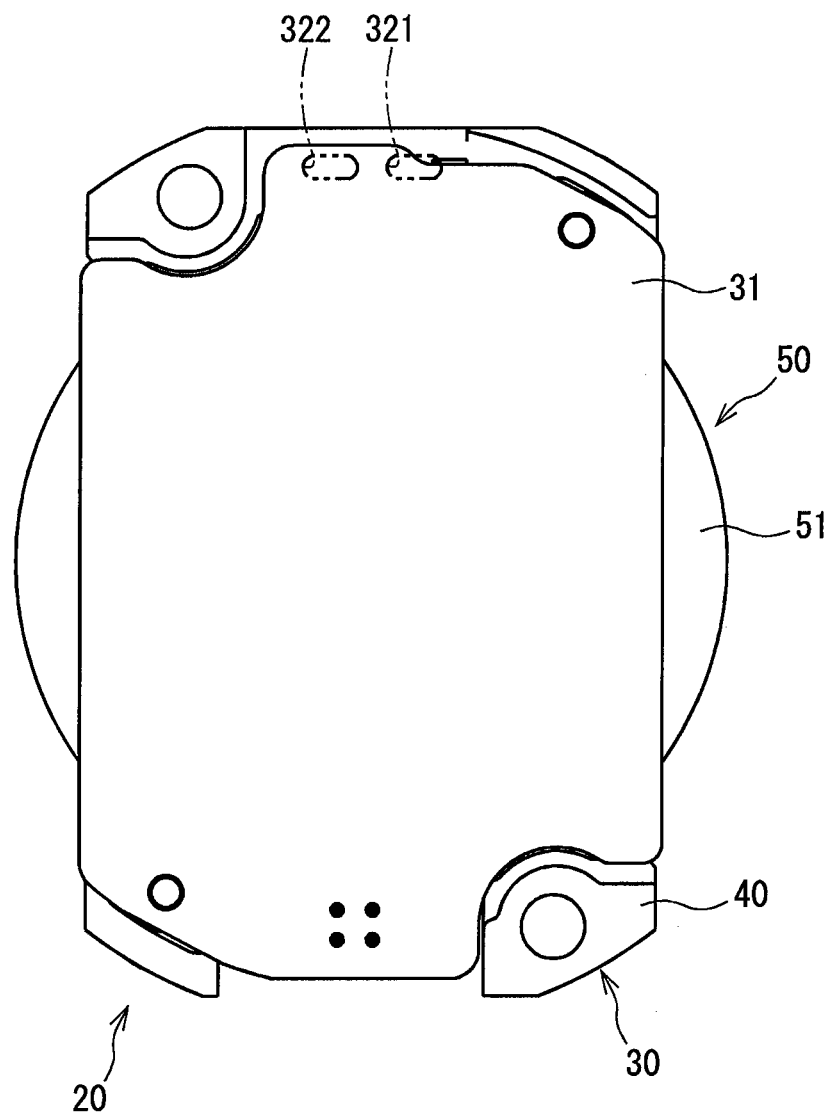
FIG. 3 is a view viewed along an arrow III in FIG. 1.

An electronic device according to the first embodiment of the present disclosure will be described with reference to FIGS. 1 to 5. As shown in FIGS. 1 to 3, an electronic device 20 of the present embodiment is employed in an actuator device 1. The actuator device 1 is employed in, for example, an electric power-steering device. The actuator device 1 includes a motor 10 and the electronic device 20. The motor 10 includes a stator, a rotor, a shaft, which is rotational integrally with the rotor, and/or the like (none shown). The motor 10 is accommodated in a motor case 11. The motor case 11 has an end (opening side) on an opposite side of an output end in an axial direction, and the end has an opening. A part of the electronic device 20 is inserted through the opening side. In the present embodiment, the motor 10 is projected in the axial direction to define a motor region. In addition, a radial direction of the motor 10 is simply referred to as a radial direction. In addition, an axial direction of the motor 10 is simply referred to as an axial direction. The axial direction corresponds to a vertical direction in FIG. 1.

The electronic device 20 includes a control unit 30 and a connector portion 50. The control unit 30 includes a control circuit board 31, a power circuit board 32, a holding member 40, and the like. The control circuit board 31 is affixed to the holding member 40 with a fastener such as a screw, such that the control circuit board 31 is located on a side of the motor 10. The control circuit board 31 is equipped with electronic components for a control system, such as a microcomputer, a pre-driver, and/or the like. In the present embodiment, as shown by an arrow Y in FIG. 1, the electronic device 20 on the side of the control circuit board 31 is inserted in the motor case 11.

The power circuit board 32 is affixed to a side of the holding member 40, which is opposite from the motor 10, by using a fastener such as a screw. The power circuit board 32 is equipped with an electronic component (not shown) for a power system. This electronic component is configured to conduct a relatively large amount of electricity and may be, for example, a capacitor and/or the like.

As shown in FIG. 2, the power circuit board 32 has a through hole 321 and a through hole 322. An electric power source terminal 61 is inserted into the through hole 321. A ground terminal 62 is inserted into the through hole 322. In the present embodiment, the power circuit board 32 has a first surface 325 and a second surface 326. The first surface 325 is located on the side of the connector portion 50. The second surface 326 is located on the side of the holding member 40. In the present embodiment, the power circuit board 32 may be equivalent to a circuit board. A power module (not shown) is equipped between the control circuit board 31 and the power circuit board 32. This power module includes a switching element to switch electricity supply to a motor winding. The power module is configured to dissipate heat, which is produced by electricity supply, to the holding member 40.

The holding member 40 is formed for a material, which has a high thermal conductivity, such as aluminum and/or the like. The holding member 40 supports the control circuit board 31, the power circuit board 32, and the connector portion 50. The holding member 40 has an accommodation chamber (not shown) opening to the power circuit board 32. The accommodation chamber accommodates a large-sized component, such as a capacitor and/or the like, mounted on a surface of the power circuit board 32 on the side of the holding member 40.

The connector portion 50 includes a base 51, legs 52, a wiring connector portion 55, and the like. The connector portion 50 is located on the opposite side of the control unit 30 from the motor 10. In other words, the connector portion 50 is not located between the circuit boards 31 and 32. The connector portion 50 is located on the opposite side of the power circuit board 32 from the motor 10. In the present embodiment, the circuit boards 31 and 32 include two boards. The connector portion 50 is formed such that the connector portion 50 is entirely located within the motor region. The motor region is a region formed by projecting the motor 10 in the axial direction. The present configuration may enable to reduce the size of the actuator device 1 in the radial direction.

The base 51 is substantially in a circular plate shape having an outer diameter less than an outer diameter of the motor 10. As shown in FIG. 2, when the electronic device 20 is viewed from the connector portion 50 along the axial direction, a part of a peripheral wall portion 511 of the base 51 is located inside an outer periphery 320 of the power circuit board 32. The legs 52 are projected radially outward from a portion of the base 51 on the side of the motor 10. The legs 52 are affixed to the holding member 40 by using fasteners, such as screws. The base 51 and the power circuit board 32 are spaced from each other in the axial direction in a state where the connector portion 50 is affixed to the holding member 40.

The wiring connector portion 55 is located substantially at a center of the base 51 and is projected to the opposite side of the motor 10. The wiring connector portion 55 has an axial end on the opposite side of the motor 10, and the axial end has an axial opening. The wiring connector portion 55 is configured to enable connection of a wiring component and/or the like through the axial end. The wiring component and/or the like is used for connection of an electric power source, controller area network (CAN), various sensors, and/or the like. The opening of the wiring connector portion 55 is not limited to be directed in the axial direction, and the opening of the wiring connector portion 55 may be directed, for example, radially outward. The connector portion 50 is connected with the control circuit board 31 via a control terminal (not shown).

As shown in FIGS. 1 to 5, the peripheral wall portion 511 has a portion formed inside the outer periphery 320 of the power circuit board 32, and the power source terminal 61 and the ground terminal 62 are projected radially outward from the portion of the peripheral wall portion 511. The power source terminal 61 conducts an electric current from the connector portion 50 into the power circuit board 32. The ground terminal 62 conducts an electric current from the power circuit board 32 into the connector portion 50. In the present embodiment, the power source terminal 61 and the ground terminal 62 are line-symmetric with each other about a center line C.

The power source terminal 61 is bent at a bent portion 611 toward the power circuit board 32. The power source terminal 61 is inserted at a tip end 617 into the through hole 321 of the power circuit board 32. The power source terminal 61 is electrically connected with the power circuit board 32 by soldering and/or the like. In the present embodiment, the power source terminal 61 is formed in a plate shape in which a length in a thickness direction is less than a length in a width direction. Therefore, the through hole 321 is formed in an ellipse shape.

Figure 4:
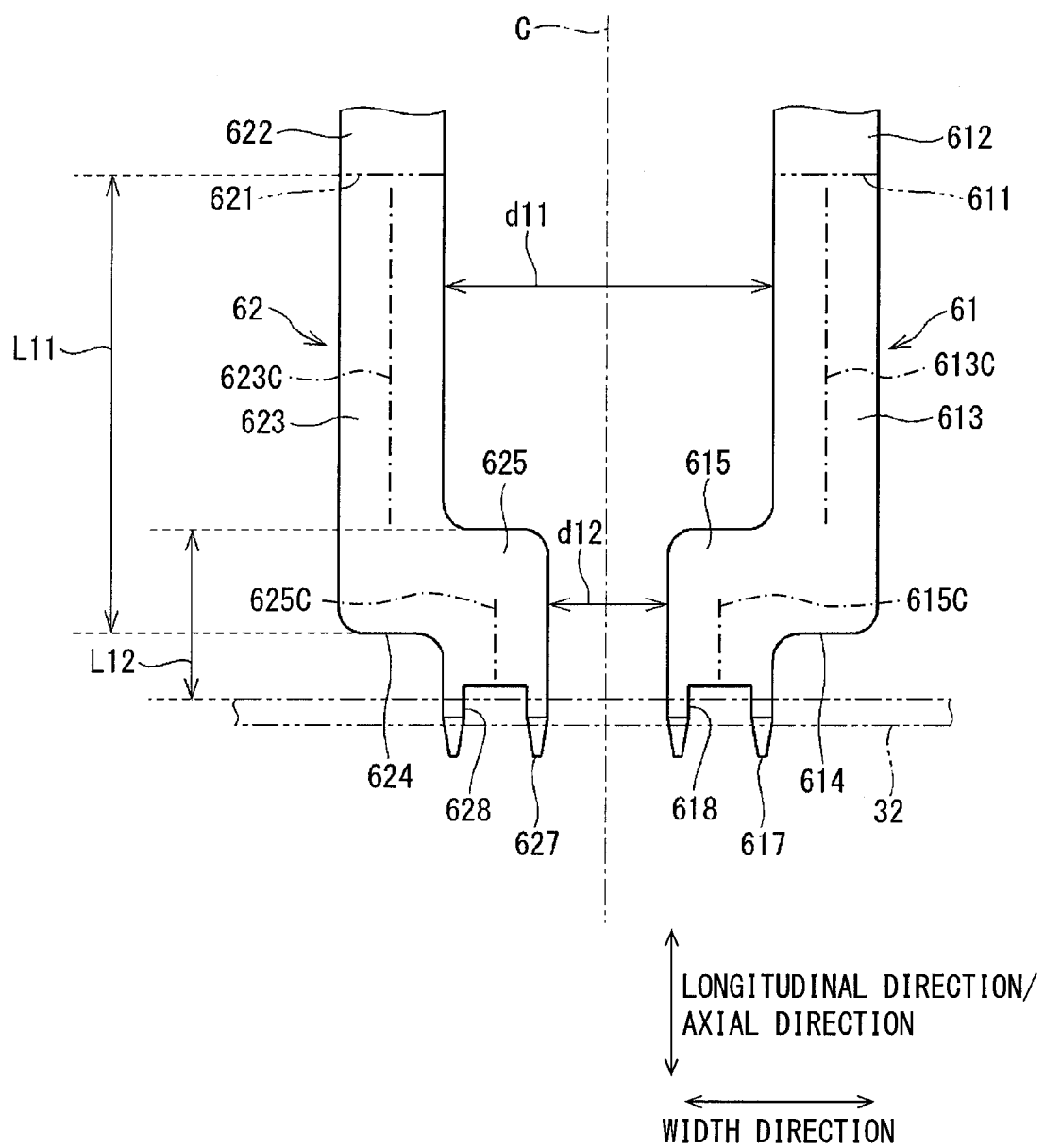
FIG. 4 is a plan view showing a power source terminal and a ground terminal according to the first embodiment of the present disclosure.

As shown in FIG. 4, the power source terminal 61 includes a projected portion 612 and an intermediate portion 613. The projected portion 612 is located closer to the peripheral wall portion 511 than the bent portion 611. The intermediate portion 613 is extended substantially perpendicularly from the bent portion 611 toward the power circuit board 32. An inserted portion 615 is shifted (staggered) from the intermediate portion 613 in the width direction. The inserted portion 615 extends to the tip end 617. The projected portion 612 is projected from the peripheral wall portion 511 substantially in parallel with the power circuit board 32.

The inserted portion 615 is projected from a tip end of the intermediate portion 613 in the width direction. The inserted portion 615 is formed such that the tip end 617 is extended beyond an end 614, which is a tip end of the intermediate portion 613, to the opposite side of the bent portion 611. In the present embodiment, the inserted portion 615 is formed closer to the ground terminal 62 than the intermediate portion 613. The inserted portion 615 is substantially perpendicular to the power circuit board 32. The inserted portion 615 is inserted in the through hole 321 at the tip end 617. The tip end 617 has a notch portion 618, which extends therethrough in the thickness direction.

Similarly to the power source terminal 61, the ground terminal 62 is projected radially outward from the peripheral wall portion 511 of the base 51 and is bent at the bent portion 621 toward the power circuit board 32. The ground terminal 62 is inserted at a tip end 627 into the through hole 322 of the power circuit board 32. The ground terminal 62 is electrically connected with the power circuit board 32 by soldering and/or the like. In the present embodiment, the ground terminal 62 is formed in a plate shape in which a length in a width direction is greater than a length in a thickness direction. Therefore, the through hole 322 is formed in an ellipse shape.

The ground terminal 62 includes a projected portion 622 and an intermediate portion 623. The projected portion 622 is located closer to the peripheral wall portion 511 than the bent portion 621. The intermediate portion 623 is extended substantially perpendicularly from the bent portion 621 toward the power circuit board 32. An inserted portion 625 is shifted (staggered) from the intermediate portion 623 in the width direction. The inserted portion 625 extends to the tip end 627. The projected portion 622 is projected from the peripheral wall portion 511 substantially in parallel with the power circuit board 32.

The inserted portion 625 is projected from a tip end of the intermediate portion 623 in the width direction. The inserted portion 625 is formed such that the tip end 627 is extended beyond an end 624, which is a tip end of the intermediate portion 623, to the opposite side of the bent portion 621. In the present embodiment, the inserted portion 625 is formed closer to the power source terminal 61 than the intermediate portion 623. The inserted portion 625 is substantially perpendicular to the power circuit board 32. The inserted portion 625 is inserted in the through hole 322 at the tip end 627. The tip end 627 has a notch portion 628, which extends therethrough in the thickness direction. In the present embodiment, the power source terminal 61 and the ground terminal 62 may be equivalent to a connector terminal.

As shown in FIGS. 1 and 3, the control circuit board 31 is equipped on the side of the second surface 326 of the power circuit board 32. The control circuit board 31 may be equivalent to a shielding member. In the present configuration, the through holes 321 and 322 are concealed by the control circuit board 31. Therefore, in the present state, the through holes 321 and 322 cannot be visible from the side of the control circuit board 31. Consequently, the present configuration may obstruct a soldering work using a jig from the side of the control circuit board 31. In consideration of this concern, according to the present embodiment, a working clearance 49 is formed on the side of the second surface 326 of the through holes 321 and 322. The working clearance 49 opens radially outward. Therefore, the working clearance 49 enables insertion of a jig and/or the like from the radially outside of the working clearance 49 to connect the terminals 61 and 62 with the power circuit board 32 by soldering and/or the like. In FIG. 3, the positions of the through holes 321 and 322 are shown by two-point chain lines for explanation.

It is further noted that, in the state where the control circuit board 31 is mounted to the holding member 40, visual confirmation of connection may become difficult. Specifically, when viewed from the side of the control circuit board 31, the present construction may obstacle visual confirmation of a connection state between the power circuit board 32 and the terminals 61 and 62 on the side of the second surface 326. Herein, it is assumable to connect the power source terminal 61 with the power circuit board 32 at a position to which the bent portion 611 is linearly extended. In this assumable configuration, the position of the connection between the power source terminal 61 and the power circuit board 32 may overlap with the projected portion 612 when viewed from the side of the first surface 325. Therefore, the assumable configuration may not enable to confirm a connection state from the side of the first surface 325. A similar concern may be applicable to the ground terminal 62.

In consideration of this concern, as shown in FIG. 2, in the power source terminal 61 according to the present embodiment, the inserted portion 615 is formed to be shifted from the projected portion 612 in the longitudinal direction of the through hole 321 when viewed from the side of the connector portion 50 in the axial direction. In this way, the present configuration renders the inserted portion 615 not to overlap with the projected portion 612. The present configuration may enable confirmation of the connection state of the power source terminal 61 and the power circuit board 32 from the side of the first surface 325, in particular, in the longitudinal direction.

Similarly, in the ground terminal 62 according to the present embodiment, the inserted portion 625 is formed to be shifted from the projected portion 622 in the longitudinal direction of the through hole 322 when viewed from the side of the connector portion 50 in the axial direction. In this way, the present configuration renders the inserted portion 625 not to overlap with the projected portion 622. The present configuration may enable confirmation of the connection state of the ground terminal 62 and the power circuit board 32 from the side of the first surface 325, in particular, in the longitudinal direction.

In addition, the tip ends 617 and 627 of the terminals 61 and 62 have the notch portions 618 and 628, respectively. The notch portions 618 and 628 extend through the tip ends 617 and 627, respectively, in the thickness direction. The present configuration may enable to spread solder steadily into the terminals 61 and 62 when the terminals 61 and 62 are connected to the power circuit board 32 from radially outside by using solder. In addition, the present configuration may enable to reduce a man hour for connection of the terminals 61 and 62 to the power circuit board 32 by using, for example, a jig having tip ends branched into three portions.

In the present embodiment, the power source terminal 61 and the ground terminal 62 are projected from the intermediate portions 613 and 623, respectively, in directions in which the inserted portions 615 and 625 approach to each other. Specifically, the intermediate portions 613 and 623 are at a distance d11 from each other. In addition, the inserted portions 615 and 625 are at a distance d12 from each other. The distance d11 and the distance d12 satisfy: d11>d12. In addition, each of the intermediate portions 613 and 623 has a length L11. In addition, each of the inserted portions 615 and 625 has a length L12. The length L11 and the length L12 satisfy: L11>L12. It is noted that, the length of the inserted portions 615 and 625 is a length from an end of the inserted portions 615 and 625 on the side of the connector portion 50 to the power circuit board 32. The same definition will be applicable in the following embodiment.

For example, it is assumable to provide two terminals, which are in the same shape and arranged side-by-side in the same direction. In this assumable configuration, the distance d11 between the intermediate portions and the distance d12 between the inserted portions are the same as each other. In this assumable configuration, the intermediate portion and the inserted portion need to be distant from the adjacent intermediate portion and the adjacent inserted portion by a terminal width or more, not to cause overlap between the projected portion of the inserted portion and the adjacent projected portion. In the present embodiment, the inserted portions 615 and 625 are projected in the directions to be in proximity with (to approach) each other. In this way, the present configuration may enable to locate the inserted portions 615 and 625 in proximity with each other as much as possible. In the present embodiment, the power source terminal 61 conducts an electric current from the connector portion 50 into the power circuit board 32. The ground terminal 62 conducts an electric current from the power circuit board 32 into the connector portion 50. That is, in the present embodiment, the power source terminal 61 and the ground terminal 62 conduct electric currents in the same quantity in the opposite directions. In the present embodiment, the inserted portions 615 and 625 are in proximity with each other as much as possible thereby to enable to reduce a magnetic circuit. Thus, the present configuration may enable to reduce leakage of a magnetic flux.

As described above, the electronic device 20 includes the power circuit board 32, the connector portion 50, the power source terminal 61 and the ground terminal 62. The power circuit board 32 is held by the holding member 40. The connector portion 50 is located on the opposite side of the power circuit board 32 from the holding member 40. The connector portion 50 is formed such that at least a part of the peripheral wall portion 511 is located inside the outer periphery 320 of the power circuit board 32.

The power source terminal 61 is formed to be projected from the peripheral wall portion 511, which is located inside the outer periphery 320 of the power circuit board 32. The power source terminal 61 is bent at the bent portion 611 toward the power circuit board 32. Thus, the power source terminal 61 is connected with the power circuit board 32. Similarly, the ground terminal 62 is formed to be projected from the peripheral wall portion 511, which is located inside the outer periphery 320 of the power circuit board 32. The ground terminal 62 is bent at the bent portion 621 toward the power circuit board 32. Thus, the ground terminal 62 is connected with the power circuit board 32.

In the present embodiment, when viewed from the side of the connector portion 50 relative to the power circuit board 32, the projected portion 612 is shifted from (stepped from) the inserted portion 615. The projected portion 612 is located closer to the peripheral wall portion 511 than the bent portion 611 of the power source terminal 61. The inserted portion 615 is inserted in the through hole 321 of the power circuit board 32. In addition, when viewed from the side of the connector portion 50 relative to the power circuit board 32, the projected portion 622 is shifted from (stepped from) the inserted portion 625. The projected portion 622 is located closer to the peripheral wall portion 511 than the bent portion 621 of the ground terminal 62. The inserted portion 625 is inserted in the through hole 322 of the power circuit board 32.

The inserted portions 615 and 625 and the projected portions 612 and 622 are shifted from each other, respectively. In this way, the projected portions 612 and 622 do not to hide the connections between the terminals 61 and 62 and the power circuit board 32, when viewed from the side of the connector portion 50 relative to the power circuit board 32. The present configuration may enable visual confirmation of the connection state between the terminals 61 and 62 and the power circuit board 32 by viewing from the side of the connector portion 50 of the power circuit board 32. Therefore, the present configuration may enable to enhance reliability of the connection. In addition, the power source terminal 61 includes the intermediate portion 613 and the inserted portion 615, which are shifted from each other. Therefore, the present configuration may enable to mitigate a stress caused by thermal variation, oscillation, and/or the like imposed onto the connection between of the power circuit board 32 and the power source terminal 61, compared with an assumable configuration in which the power circuit board 32 is extended linearly from the bent portion 611 to form a straight shape.

The control circuit board 31 is equipped on the opposite side of the power circuit board 32 from the connector portion 50. The control circuit board 31 screens the through holes 321 and 322. The working clearance 49 is formed between the power circuit board 32 and the control circuit board 31 to enable insertion of a jig, which is used to connect the terminals 61 and 62 with the power circuit board 32.

In the present embodiment, the control circuit board 31 conceals the connection between the terminals 61 and 62 and the power circuit board 32 when viewed from an opposite side of a side of the holding member 40 to which the power circuit board 32 is equipped. Therefore, the control circuit board 31 obstacles the visual confirmation. It is noted that, the present configuration enables confirmation of the connection state from the side of the connector portion 50. In addition, the working clearance 49 is formed to enable, for example, insertion of a jig from the outside in the radial direction thereby to enable connection of the terminals 61 and 62 with the power circuit board 32 appropriately.

The notch portions 618 and 628 are formed in the inserted portions 615 and 625, respectively. The present configuration may enable to spread solder inside the terminals 61 and 62 by, for example, insertion of a jig from the radially outside to solder the connection. Therefore, the present configuration may enable to connect the inside of the terminals 61 and 62 steadily.

Each of the inserted portions 615 and 625 is formed in a flat shape. The projected portions 612 and 622 are shifted from the inserted portions 615 and 625, respectively, in longitudinal directions of the inserted portions 615 and 625 when viewed from the side of the connector portion 50. The present configuration may enable confirmation of the connection state between the terminals 61 and 62 and the power circuit board 32 in the longitudinal directions from the side of the connector portion 50.

In the present embodiment, the intermediate portions 613 and 623 extend toward the power circuit board 32 from the bent portions 611 and 621 of the power source terminal 61 and the ground terminal 62, respectively. The inserted portions 615 and 625 of the two adjacent terminals 61 and 62 are projected from the intermediate portions 613 and 623, respectively, in the direction to be in proximity with each other. The present configuration may enable to reduce a magnetic flux leak in a configuration in which the two terminals 61 and 62 conduct electric currents in opposite directions.

Second Embodiment

Figure 6:
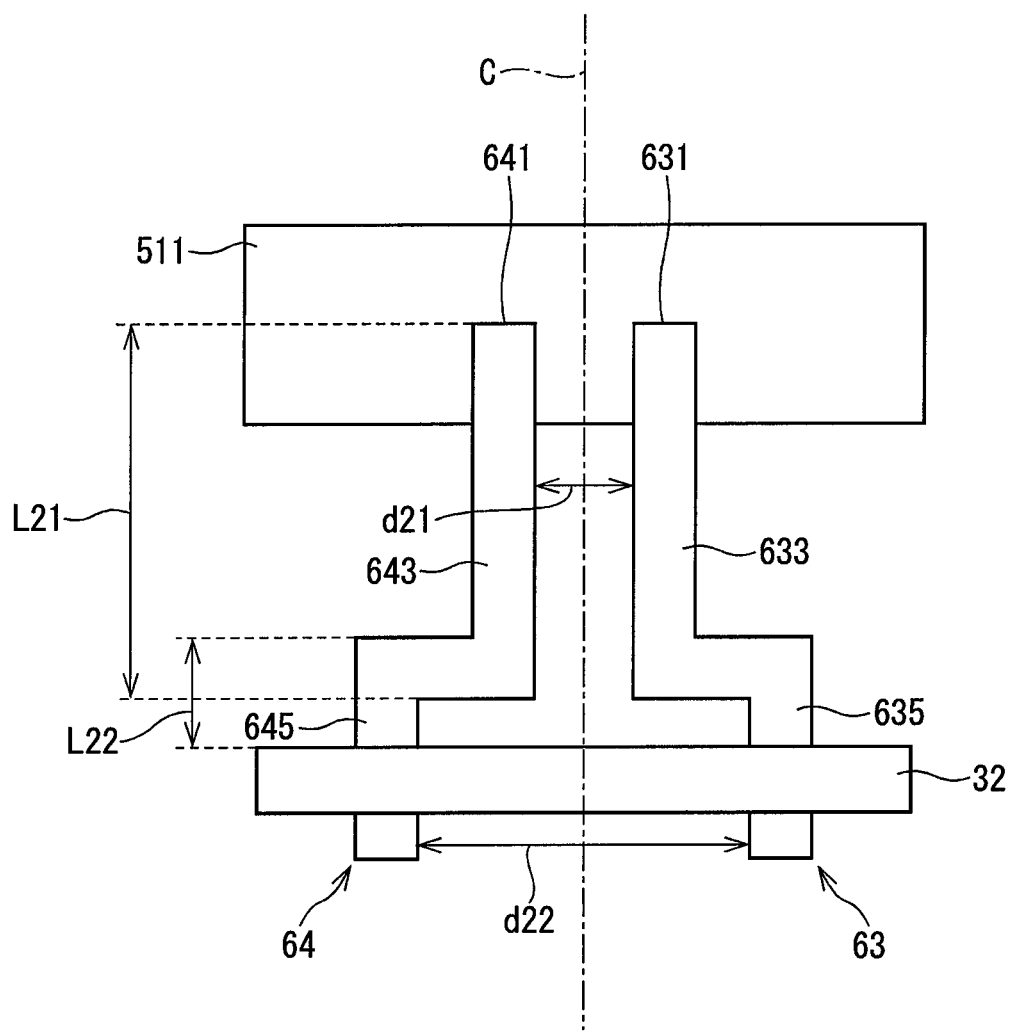
FIG. 6 is a schematic view showing an electronic device according to a second embodiment of the present disclosure.
Figure 7:
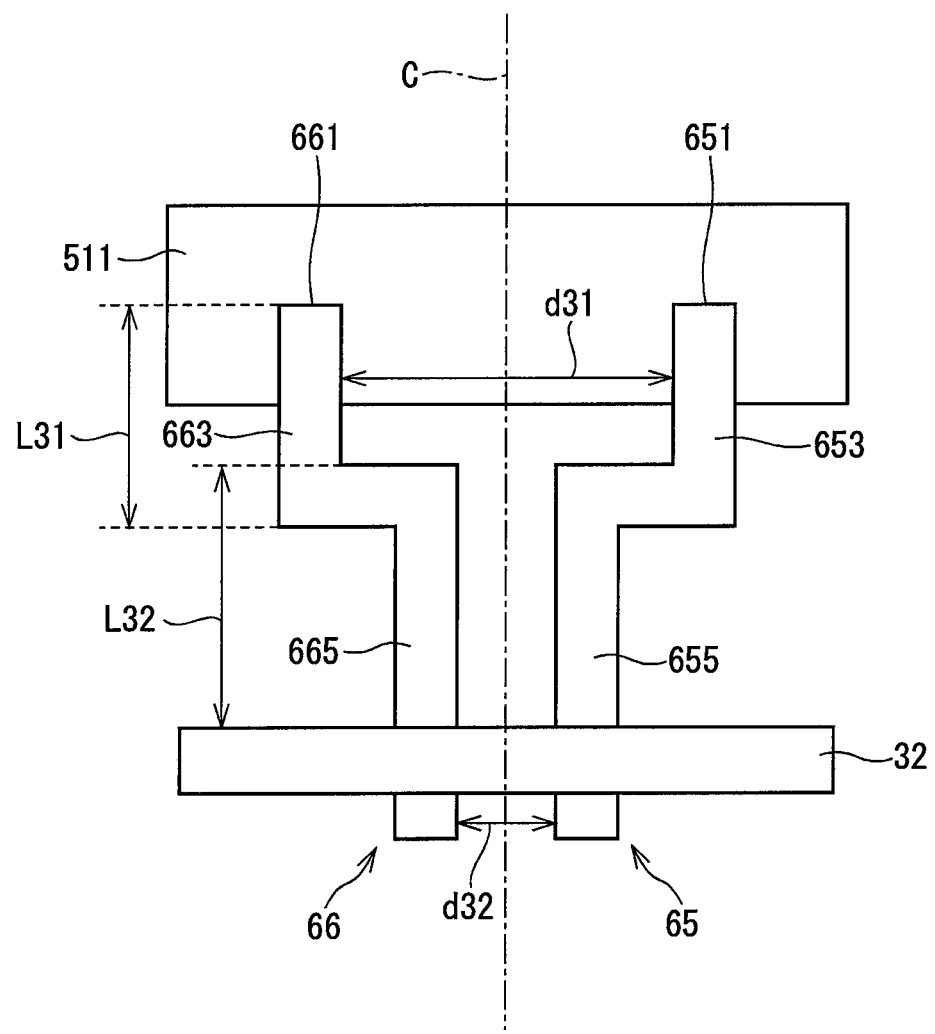
FIG. 7 is a schematic view showing an electronic device according to a third embodiment of the present disclosure.

FIG. 6 shows a second embodiment of the present disclosure. The present second embodiment is different from the first embodiment in the shapes of the power source terminal 63 and the ground terminal 64. Therefore, the difference will be described mainly as follows. In FIG. 6, the power circuit board 32, the base 51 of the connector portion 50, the power source terminal 63, and the ground terminal 64 are schematically shown, and other components are omitted. FIG. 7 also schematically shows the components and omits illustration of other components.

A power source terminal 63 includes a projected portion (not shown), a bent portion 631, an intermediate portion 633, and an inserted portion 635. The power source terminal 63 of the present embodiment is substantially similar to the power source terminal 61 of the above-described embodiment excluding a configuration in which the inserted portion 635 is projected in a direction to be spaced away from the ground terminal 64. A ground terminal 64 includes a projected portion (not shown), a bent portion 641, an intermediate portion 643, and an inserted portion 645. In the present embodiment, the ground terminal 64 is substantially similar to the ground terminal 62 of the above-described embodiment excluding a configuration in which the inserted portion 645 is projected in a direction to be spaced away from the power supply terminal 63.

In the present embodiment, a distance d21, which is between the intermediate portions 633 and 643, is less than a distance d22, which is between the inserted portions 635 and 645. In addition, the length L21 of the intermediate portions 633 and 643 is greater than the length L22 of the inserted portions 635 and 645. That is, the length L21 and the length L22 satisfy: L21>L22. In the present embodiment, the ground terminal 64 and the power source terminal 63 conduct electric currents in the same quantity and in the opposite directions. Therefore, the magnetic circuit formed by electricity supply can be reduced by enlarging the length L21 of the intermediate portions 633 and 643, which are closer to each other than the inserted portions 635 and 645, than the length L22 of the inserted portions 635 and 645. Thus, the present configuration may enable to reduce leakage of magnetic flux.

In the present embodiment, the inserted portions 635 and 645 are projected in the directions to be distant away from each other. In this way, the present configuration may enable to locate the intermediate portions 633 and 643 in proximity with each other as much as possible. The present configuration may enable to reduce leakage of magnetic flux, similarly to the above embodiments. It is noted that, the intermediate portions 633 and 643 are closer to each other than the inserted portions 635 and 645. Therefore, leakage of magnetic flux can be reduced effectively by enlarging the intermediate portions 633 and 643 as much as possible. Thus, the length L21 and the length L22 may satisfy: L21>L22. It is further noted that, even in a configuration, which does not satisfy: L21>L22, the configuration may still enable to reduce leakage of magnetic flux. Therefore, a configuration, which satisfies: L21=L22 or a configuration, which satisfies: L21<L22 may be employable.

In the present embodiment, the intermediate portions 633 and 643 extend toward the power circuit board 32 from the terminals 63 and 64, respectively. The inserted portions 635 and 645 of the two adjacent terminals 63 and 64 are projected from the intermediate portions 633 and 643, respectively, in the direction to be spaced away from each other. The present configuration may enable to reduce a magnetic flux leak in a configuration in which the two terminals 61 and 62 conduct electric currents in opposite directions.

In addition, the intermediate portions 633 and 643 have the length greater than the length of the inserted portions 635 and 645. The present configuration may enable to reduce leakage of magnetic flux by elongating the intermediate portions 633 and 643, which are in proximity to each other, as much as possible. The present embodiment may produce an effect similarly to the above embodiments. In the present embodiment, the power source terminal 63 and the ground terminal 64 may be equivalent to a connector terminal.

Third Embodiment

FIG. 7 shows a third embodiment of the present disclosure. The present third embodiment is different from the first and second embodiments in the shapes of the power source terminal 65 and the ground terminal 66. Therefore, the difference will be described mainly as follows.

A power source terminal 65 includes a projected portion (not shown), a bent portion 651, an intermediate portion 653, and an inserted portion 655. In the present embodiment, the inserted portion 655 is projected toward the ground terminal 66, similarly to the first embodiment. A ground terminal 66 includes a projected portion (not shown), a bent portion 661, an intermediate portion 663, and an inserted portion 665. In the present embodiment, the inserted portion 665 is projected toward the power supply terminal 65, similarly to the first embodiment.

In the present embodiment, a distance d32, which is between the inserted portions 655 and 665, is less than a distance d31, which is between the intermediate portions 653 and 663. In addition, the length L32 of the inserted portions 655 and 665 is greater than the length L31 of the intermediate portions 653 and 663. That is, the length L31 and the length L32 satisfy: L31<L32. In the present embodiment, the ground terminal 66 and the power source terminal 65 conduct electric currents in the same quantity and in the opposite directions. Therefore, the magnetic circuit formed by electricity supply can be reduced by enlarging the length L32 of the inserted portions 655 and 665, which are closer to each other than the intermediate portions 653 and 663, than the length L31 of the intermediate portions 653 and 663. Thus, the present configuration may enable to reduce leakage of magnetic flux.

In the present embodiment, the inserted portions 655 and 665 are closer to each other than the intermediate portions 653 and 663. Therefore, leakage of magnetic flux can be reduced effectively by elongating the inserted portions 655 and 665 as much as possible. Thus, the length L31 and the length L32 may satisfy: L31<L32. It is further noted that, even in a configuration, which does not satisfy: L31<L32, the configuration may still enable to reduce leakage of magnetic flux. Therefore, a configuration, which satisfies: L31=L32 or a configuration, which satisfies: L31>L32 may be employable.

In the present embodiment, the inserted portions 655 and 665 are longer than the intermediate portions 653 and 663. The present configuration may enable to reduce leakage of magnetic flux further effectively by elongating the inserted portions 655 and 665, which are in proximity to each other, as much as possible in a configuration in which the two terminals 65 and 66 conduct electric currents in opposite directions. The present embodiment may produce an effect similarly to the above embodiments. In the present embodiment, the power source terminal 65 and the ground terminal 66 may be equivalent to a connector terminal.

Other Embodiment (a) Connector Terminal

In the above-described embodiments, the connector terminals are the power source terminal and the ground terminal. According to another embodiment, the connector terminal may be a terminal other than the power source terminal and the ground terminal. The number of the terminals is not limited to two and may take any one of various numbers. In the above-described embodiment, the notch portion is formed in the tip end of the connector terminal. In another embodiment, the configuration of the notch portion, such as the number, the shape, the formation position, and/or the like, is not limited to those in the above-described embodiment. The configuration of the notch portion may employ various variations to enable solder and/or the like to flow inside the connector terminal. The notch portion may be omitted.

In the above embodiments, the connector terminal is formed in the plate shape in which the length in the width direction is relatively greater than the length in the thickness direction. According to another embodiment, the shape of the connector terminal is not limited to the plate shape. The connector terminal may employ various shapes in cross section, such as a square shape, a circular shape, a shape in which lengths are the same in both thickness and width directions, and/or the like. It is noted that, the projected portion and the inserted portion may be shifted in a direction along a long side rather than in a direction along a short side, according to the shape of the connector terminal. The present configuration may enlarge a region in which visual confirmation is enabled. To the contrary, in a configuration in which the terminal shape does not have a long side and a short side distinctively, the projected portion and the inserted portion may be shifted in an arbitrary direction.

In the above embodiments, the two adjacent connector terminals are line-symmetric to each other. The inserted portions are projected from the intermediate portions, respectively, in the direction to be in proximity with each other or in the direction to be spaced away (distant) from each other. According to another embodiment, two adjacent connector terminals need not be line-symmetric with each other. Furthermore, multiple connector terminals in the same shape may be arranged side-by-side in the same direction. That is, the distance between the intermediate portions may be the same as the distance between the inserted portions. Multiple connector terminals may be different from each other in shape.

(b) Circuit Board

In the above-described embodiment, the circuit board, which is connected with the connector terminals, is a power circuit board to which a power electric component, such as a capacitor, is mounted. In another embodiment, the circuit board is not limited to a power circuit board and may be another electric component. For example, the connector terminal may be a terminal connected to a control circuit board. In this case, this control circuit board may be equivalent to the circuit board. In the above-described embodiment, the control unit includes the two circuit boards. In another embodiment, the number of the circuit boards may not be two and may take any one of various numbers.

(c) Holding Member

In the above embodiments, the holding member is formed of a material having a high thermal conductivity and has a heat dissipating function. According to another embodiment, the holding member is not limited to have a heat dissipating function. The holding member may be configured simply to hold the circuit board.

(d) Shielding Member

In the above-described embodiment, the shielding member is a control circuit board. According to another embodiment, the shielding member is not limited to a control circuit board. The shielding member may be another component such as a holding member and/or the like.

(e) Electronic Device

In the above embodiments, the electronic device is integrated with the motor and is employed in an electric power-steering device. According to another embodiment, the electronic devices may be a separate component from the motor. The electronic devices may be employed in a device other than the electric power-steering device. The electronic devices may be employed in a device other than the motor.

Figure 5:
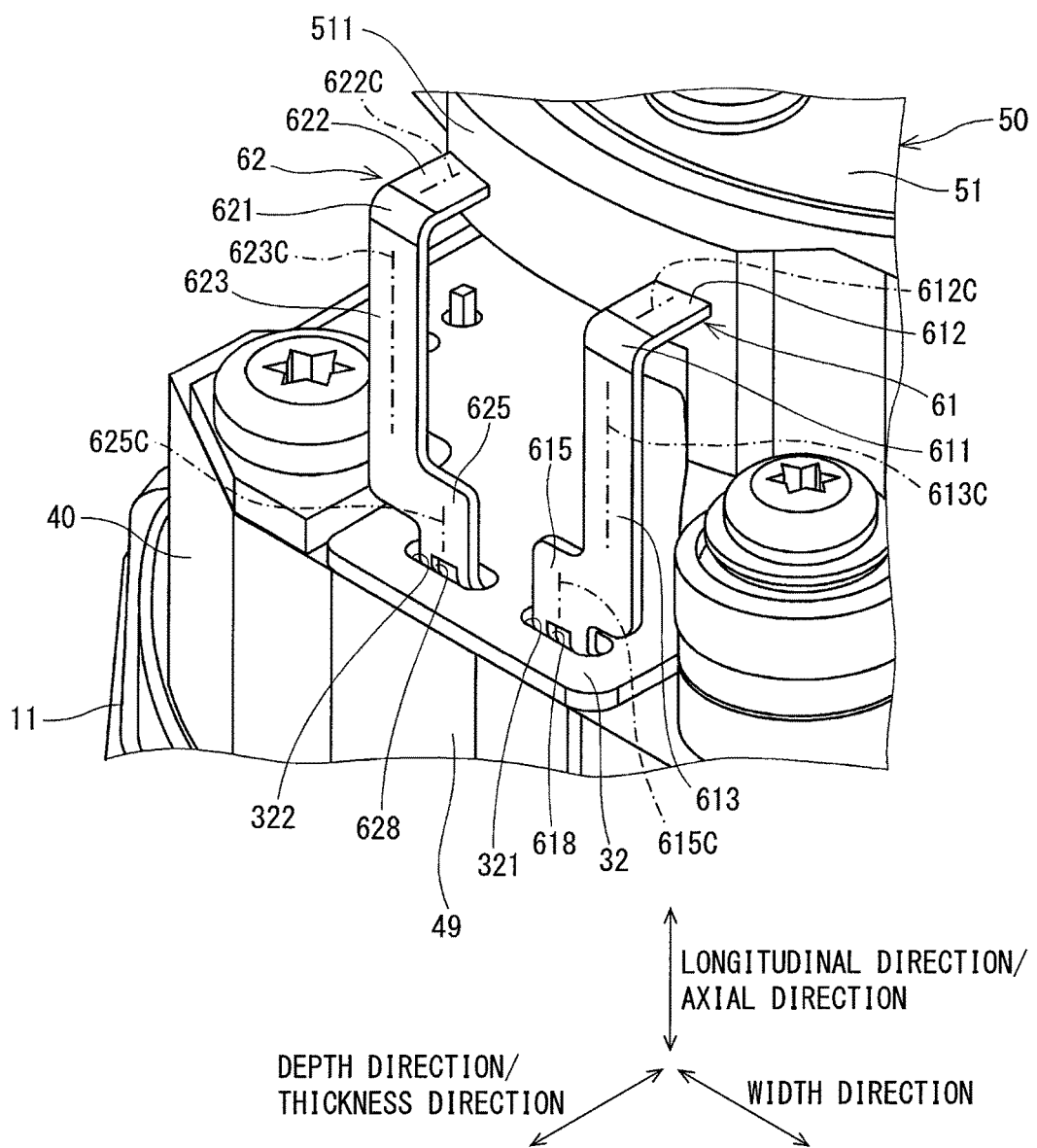
FIG. 5 is a perspective view showing the power source terminal and the ground terminal according to the first embodiment of the present disclosure.

As shown in FIG. 5, the protected portions 612 and 622 have center lines 612C and 622C, respectively. As shown in FIGS. 4 and 5, the intermediate portions 613 and 623 have center lines 613C and 623C, respectively. The inserted portions 615 and 625 have center lines 615C and 625C, respectively. As shown in FIGS. 2 and 5, the protected portions 612 and 622 linearly extend from the peripheral wall portion 511 of the base 51 to the bent portions 611 and 621, respectively, in a depth direction.

According to the present disclosure, the electronic device includes the circuit board, the connector portion, and the connector terminal. The circuit board is held by the circuit board holding member. The connector portion is equipped to the opposite side of the circuit board from the circuit board holding member. The peripheral wall portion of the connector portion is at least partially inside the outer periphery of the circuit board. The connector terminal is projected from the peripheral wall portion, which is located inside relative to the outer periphery of the circuit board. The connector terminal is bent at the bent portion toward the circuit board and is connected with the circuit board.

When viewed from the side of the connector portion relative to the circuit board, the projected portion, which is on the side of the peripheral wall portion relative to the bent portion of the connector terminal, is shifted from the inserted portion, which is inserted in the through hole of the circuit board. In the present configuration, the inserted portion and the projected portion are shifted from each other. Therefore, when viewed from the side of the connector portion of the circuit board, the connection between the circuit board and the connector terminal is not concealed by the projected portion. The present configuration may enable visual confirmation of the connection state between the connector terminal and the circuit board by viewing from the side of the connector portion of the circuit board. Therefore, the present configuration may enable to enhance reliability of the connection.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electronic device comprising:
   a circuit board held by a holding member;
   a connector portion located on a planar surface of the circuit board that is an opposite side of the holding member, the connector portion having a peripheral wall portion, which has a portion inside an outer periphery of the circuit board; and
   two connector terminals projecting from the portion of the peripheral wall portion, each of the two connector terminals being bent at a bent portion to be directed toward the circuit board and being connected with the circuit board, wherein each of the two connector terminals includes a projected portion, the bent portion, an intermediate portion, and an inserted portion connected in this order,
the projected portion is located between the peripheral wall portion and the bent portion,
the inserted portion is inserted into a through hole of the circuit board,
the projected portion has a center line that is offset from a center line of the inserted portion both in a longitudinal direction and a width direction of the inserted portion, and
the projected portion linearly extends from the peripheral wall portion to the bent portion substantially in parallel with the planar surface of the circuit board.

2. The electronic device according to claim 1, further comprising:
a shielding member located on an opposite side of the circuit board from the connector portion, wherein
the shielding member shields the through hole,
the circuit board and the shielding member form a working clearance therebetween, and
the working clearance is configured to enable insertion of a jig for connecting the two connector terminals with the circuit board.

3. The electronic device according to claim 1, wherein the inserted portion has a notch portion.

4. The electronic device according to claim 1, wherein the inserted portion is in a flat shape.

5. The electronic device according to claim 1, wherein the intermediate portion extends from the bent portion toward the circuit board,
the inserted portion extends from the intermediate portion, and
the inserted portion of one of the two connector terminals and the inserted portion of an other of the two connector terminals are adjacent to each other and extend in a direction to be spaced away from each other.

6. The electronic device according to claim 5, wherein the intermediate portion is longer than the inserted portion.

7. The electronic device according to claim 1, wherein the intermediate portion extends from the bent portion toward the circuit board,
the inserted portion extends from the intermediate portion, and
the inserted portion of one of the two connector terminals and the inserted portion of an other of the two connector terminals are adjacent to each other and in a direction to be in proximity with each other.

8. The electronic device according to claim 7, wherein the inserted portion is longer than the intermediate portion.

9. The electronic device according to claim 1, wherein each of the two connector terminals is formed in a plate shape in which a dimension in a thickness direction is less than a dimension in a width direction.

10. The electronic device according to claim 9, wherein the projected portion has a flat surface opposed to the circuit board, and
the flat surface is substantially in parallel with the planar surface of the circuit board.

11. The electronic device according to claim 1, wherein the two connector terminals are line-symmetric with each other about a center line located at a center between the two connector terminals.

12. The electronic device according to claim 1, wherein one of the two connector terminals includes the inserted portion and the intermediate portion as a first inserted portion and a first intermediate portion, respectively,
an other of the two connector terminals includes the inserted portion and the intermediate portion as a second inserted portion and a second intermediate portion, respectively, and
the first inserted portion and the second inserted portion extend from the first intermediate portion and the second intermediate portion, respectively, in directions in which the first inserted portion and the second inserted portion approach to each other.

13. An electronic device comprising:
a circuit board having a planar surface and held by a holding member;
a connector portion located on the planar surface of the circuit board that is an opposite side of the holding member, the connector portion having a peripheral wall portion, which has a portion inside an outer periphery of the circuit board; and
two connector terminals each being in a plate shape and connecting the peripheral wall portion with the circuit board, wherein
each of the two connector terminals includes a projected portion, a bent portion, an intermediate portion, and an inserted portion connected in this order,
each of the two connector terminals is bent at the bent portion,
the projected portion linearly extends from the peripheral wall portion to the bent portion in a depth direction along the planar surface of the circuit board,
the intermediate portion extends from the bent portion toward the circuit board in an axial direction, the axial direction being perpendicular to the depth direction,
the inserted portion extends from the intermediate portion in the axial direction toward the circuit board, and
the inserted portion has a tip end inserted into a through hole of the circuit board.

14. The electronic device according to claim 13, wherein the intermediate portion and the inserted portion are in a crank form in which a center line of the intermediate portion is offset from a center line of the inserted portion.

15. The electronic device according to claim 13, wherein one of the two connector terminals includes the inserted portion and the intermediate portion as a first inserted portion and a first intermediate portion, respectively,
an other of the two connector terminals includes the inserted portion and the intermediate portion as a second inserted portion and a second intermediate portion, respectively, and
the first inserted portion and the second inserted portion extend from the first intermediate portion and the second intermediate portion, respectively, in directions in which the first inserted portion and the second inserted portion approach to each other.

* * * * *